(12) United States Patent
Cho et al.

(10) Patent No.: US 12,443,951 B2
(45) Date of Patent: Oct. 14, 2025

(54) APPARATUS AND METHOD OF ISSUING CENTRALIZED NON-FUNGIBLE TOKEN BY USING INTERPLANETARY FILE SYSTEM

(71) Applicant: Samsung Electronics Co., Ltd., Suwon-si (KR)

(72) Inventors: Sungho Cho, Suwon-si (KR); Bumhan Kim, Suwon-si (KR); Seungwon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/962,150

(22) Filed: Oct. 7, 2022

(65) Prior Publication Data

US 2023/0141154 A1 May 11, 2023

Related U.S. Application Data

(63) Continuation of application No. PCT/KR2022/012500, filed on Aug. 22, 2022.

(30) Foreign Application Priority Data

Nov. 9, 2021 (KR) .......................... 10-2021-0152887

(51) Int. Cl.
*G06Q 20/38* (2012.01)
*G06F 16/16* (2019.01)

(52) U.S. Cl.
CPC ......... *G06Q 20/389* (2013.01); *G06F 16/164* (2019.01); *G06Q 20/3825* (2013.01); *G06Q 20/3829* (2013.01)

(58) Field of Classification Search
CPC ....... G06F 16/164; G06F 21/64; G06Q 20/38; G06Q 20/40
See application file for complete search history.

(56) References Cited

U.S. PATENT DOCUMENTS

| | | | |
|---|---|---|---|
| 2020/0036772 A1 | 1/2020 | Xie | |
| 2020/0053081 A1 | 2/2020 | Park et al. | |

(Continued)

FOREIGN PATENT DOCUMENTS

| | | | | |
|---|---|---|---|---|
| CN | 113159734 A | * | 7/2021 | ............. G06Q 10/10 |
| CN | 113570387 B | * | 9/2023 | ......... G06Q 30/0185 |

(Continued)

OTHER PUBLICATIONS

Steve Simkins, NFTs and Pinata, Jun. 25, 2021, https://knowledge.pinata.cloud/en/articles/5455523-nfts-and-pinata (Year: 2021).*

(Continued)

*Primary Examiner* — Hao Fu
(74) *Attorney, Agent, or Firm* — Jefferson IP Law, LLP

(57) ABSTRACT

A method, performed by a server, of managing a non-fungible token (NFT) for content, is provided. The method includes, in response to receiving a request to issue an NFT for target content from a first electronic device of a first user who has generated the target content, generating basic metadata on the target content, uploading the generated basic metadata to a target folder generated in an interplanetary file system (IPFS), generating first ownership metadata including a content identifier (CID) of the uploaded basic metadata, obtaining a first CID of the target folder with the first ownership metadata uploaded to the target folder, and linking the obtained first CID of the target folder to an NFT uniform resource identifier (URI) of the target content.

20 Claims, 7 Drawing Sheets

(56) References Cited

U.S. PATENT DOCUMENTS

| | | | |
|---|---|---|---|
| 2021/0097508 A1 | 4/2021 | Papanikolas | |
| 2021/0248214 A1* | 8/2021 | Goldston | G06F 21/16 |
| 2022/0342958 A1* | 10/2022 | Lillard | G06F 16/51 |
| 2023/0045546 A1* | 2/2023 | Kim | H04L 9/50 |

FOREIGN PATENT DOCUMENTS

| | | |
|---|---|---|
| JP | 2020-201564 A | 12/2020 |
| KR | 10-2021-0029914 A | 3/2021 |
| KR | 10-2021-0041459 A | 4/2021 |
| KR | 10-2021-0059589 A | 5/2021 |
| WO | 2021/144479 A1 | 7/2021 |

OTHER PUBLICATIONS

International Search Report dated Nov. 28, 2022, issued in International Patent Application No. PCT/KR2022/012500.
Juan Benet, IPFS—Content Addressed, Versioned, P2P File System (DRAFT 3), Jul. 14, 2014.

\* cited by examiner

APPARATUS AND METHOD OF ISSUING CENTRALIZED NON-FUNGIBLE TOKEN BY USING INTERPLANETARY FILE SYSTEM

CROSS-REFERENCE TO RELATED APPLICATION(S)

This application is a continuation application, claiming priority under § 365 (c), of International application No. PCT/KR2022/012500, filed on Aug. 22, 2022, which is based on and claims the benefit of a Korean patent application number 10-2021-0152887, filed on Nov. 9, 2021, in the Korean Intellectual Property Office, the disclosure of each of which is incorporated by reference herein in its entirety.

BACKGROUND

1. Field

The disclosure relates to an apparatus and method of issuing a centralized non-fungible token (NFT) by using an interplanetary file system (IPFS).

2. Description of Related Art

A non-fungible token (NFT) may be a token for assigning a unique and non-replaceable identification value to digital content by using blockchain technology. The NFT may be generally created by using an Ethereum protocol in a format of an Ethereum Request for Comments (ERC)-721 and may be based on non-exchangeability unlike typical cryptocurrencies. The NFT has sparsity because a one-to-one transaction is not completable, and an irreversible transaction may be ensured. The NFT may be used to trade ownership of a game item, music, and/or an art piece. An owner of digital content may prove their ownership of the digital content by using their NFT and may trade their NFT with another user by using a blockchain. In addition, a history of ownership changes may be permanently recorded through the blockchain. A data size storable in the blockchain is limited because a cost increases in proportion to the data size. Therefore, metadata information on digital content may be stored in a separate storage other than the blockchain and an address value stored in the separate storage may only be included in the blockchain. In this case, a distributed storage, such as an interplanetary file system (IPFS), may be generally used as the separate storage and a public blockchain, such as Ethereum, may be used to manage an ownership history.

The above information is presented as background information only to assist with an understanding of the disclosure. No determination has been made, and no assertion is made, as to whether any of the above might be applicable as prior art with regard to the disclosure.

SUMMARY

When storing data in public blockchains, compared to storing data in an interplanetary file system (IPFS), time and fees that are needed to generate and verify blocks may gradually increase as a chain increases. In addition, when storing data in the public blockchains, large energy consumption thereof may cause environmental problems. Accordingly, a system for generating non-fungible tokens (NFTs) and managing a history of the NFTs without using a blockchain may be needed.

However, there may be many restrictions in issuing the NFTs and managing the history of the NFTs only by using the IPFS without the public blockchains. First, there may not be an open approach to verifying the NFTs' history. In the IPFS, a user may access certain data by using a content identifier (CID), which is an address in the IPFS. However, the IPFS may not have a mechanism, such as a blockchain ledger (or a smart contract), for publicly recording data. Accordingly, the user may need to know the CID of the certain data to access the certain data. However, the CID may change whenever content is updated and a new CID may need to be provided to share updated content. To solve this issue, an address system, such as an interplanetary naming service (IPNS), may be used. In the IPNS, though, keys respectively included by nodes of the IPFS and addresses respectively bound to the nodes of the IPFS may need to be used, and accordingly, a new key may need to be generated for every content. Therefore, the IPNS may not be suitable for a mobile environment. Second, there may not be a function of managing a history of ownership changes. When using a blockchain, NFT issuance and ownership changes may be processed and recorded by using a smart contract. However, the IPFS may not have such a mechanism and may thus not readily issue NFTs and manage the history of ownership changes through a consistent protocol.

Aspects of the disclosure are to address at least the above-mentioned problems and/or disadvantages and to provide at least the advantages described below. Accordingly, an aspect of the disclosure is to provide an apparatus and method of issuing a centralized NFT by using an IPFS.

Additional aspects will be set forth in part in the description which follows and, in part, will be apparent from the description, or may be learned by practice of the presented embodiments.

In accordance with an aspect of the disclosure, an apparatus for managing an NFT for content is provided. The apparatus includes a memory configured to store computer-executable instructions and a processor configured to execute the computer-executable instructions by accessing the memory, in which, when the computer-executable instructions are executed by the processor, the processor is configured to, in response to receiving a request to issue an NFT for target content from a first electronic device of a first user who has generated the target content, generate basic metadata on the target content, upload the generated basic metadata to a target folder generated in an IPFS, generate first ownership metadata including a CID of the uploaded basic metadata, obtain a first CID of the target folder that is updated with the first ownership metadata uploaded to the target folder, and link the obtained first CID of the target folder to an NFT uniform resource identifier (URI) of the target content.

In accordance with another aspect of the disclosure, a method, performed by a server, of managing an NFT for content is provided. The method includes, in response to receiving a request to issue an NFT for target content from a first electronic device of a first user who has generated the target content, generating basic metadata on the target content, uploading the generated basic metadata to a target folder generated in an IPFS, generating first ownership metadata including a CID of the uploaded basic metadata, obtaining a first CID of the target folder updated with the first ownership metadata uploaded to the target folder, and linking the obtained first CID of the target folder to an NFT URI of the target content.

According to an example embodiment, an apparatus for managing an NFT for content, by using an IPFS and an NFT URI without a blockchain, may issue an NFT for target content and manage an NFT history of the target content. Accordingly, the apparatus for managing the NFT for content may prevent low performance and fees incurred when using the blockchain.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
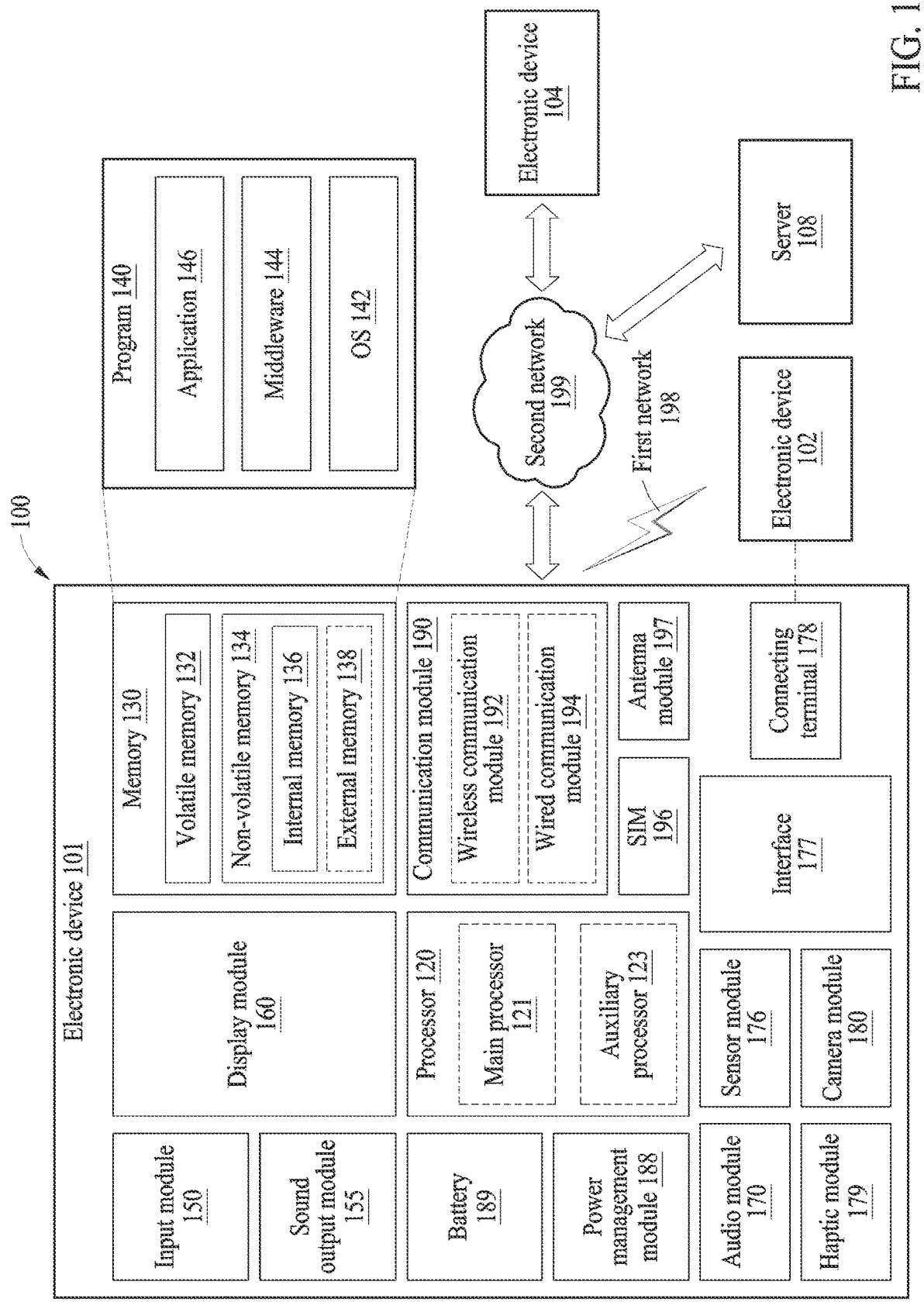
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment, the display module 160 may include a touch sensor adapted to detect a touch, or a pressure sensor adapted to measure the intensity of force of the touch.

The audio module 170 may convert sound into an electric signal or vice versa. According to an example embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an example embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, and flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC on a first surface (e.g., the bottom surface) of the PCB, or adjacent to the first surface of the PCB and capable of supporting a designated high-frequency band (e.g., a mm Wave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an example embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In an example embodiment, the external electronic device (e.g., the electronic device 104) may include an Internet-of-things (IoT) device. The server 108 may be an intelligent server using machine learning and/or a neural network. According to an example embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

According to a comparative example embodiment, when generating a non-fungible token (NFT) for content, information on the content may be stored in an interplanetary file system (IPFS). The IPFS may be a distributed peer-to-peer (P2P) file system and may refer to a data storage including many distributed nodes. The IPFS may use data itself, not a path of data, as an address by using a hash technique, and the address may be referred to as a content identifier (CID or content ID) (or IPFS CID). The CID may refer to a unique ID assigned to data uploaded to the IPFS. For example, the CID may be generated by hashing content of data and thus may change when the content of the data changes. The CID may be assigned to a folder generated in the IPFS, and the CID of the folder may change when the structure of the folder changes. Accordingly, when pieces of data having the same content are stored in the IPFS, since the IPFS may use data itself as an address, the pieces of data may have the same CID.

The IPFS may provide a method of ensuring invariability of content connected to the NFT. However, the method may be dependent on a certain blockchain because the method may need to use a separate public blockchain (e.g., Ethereum) to prove ownership of the NFT. The public blockchain may need to generate a new block to rewrite data, and time and the number of nodes needed to generate and verify blocks may increase as a chain increases. The public blockchain may request fees for nodes providing resources when generating the blocks, and the fees to be paid may increase as the number of nodes increases. For example, the Mainnet of Ethereum, which is generally used in the NFT, is saturated by requests, and accordingly, its performance of processing transactions has greatly decreased and fees for using the Mainnet has also greatly increased. Furthermore, when using a blockchain using a proof-of-work (Pow) consensus algorithm in a process of generating blocks, high computing power may be needed to generate the blocks, which may lead to a waste of energy that causes environmental issues.

Figure 2A:
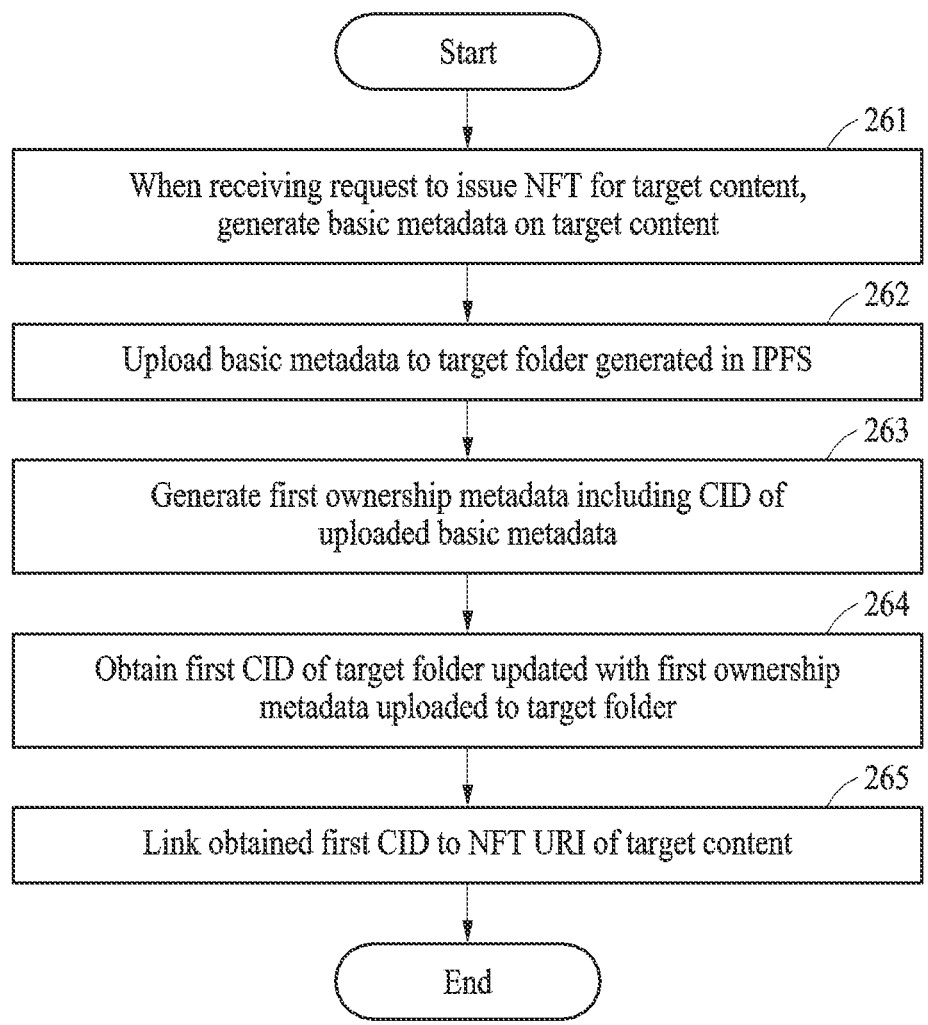
FIG. 2A is a flowchart illustrating issuing a non-fungible token (NFT) for target content by a server for managing an NFT, according to an embodiment of the disclosure.

FIG. 2A is a flowchart illustrating issuing an NFT for target content by a server for managing an NFT, according to an embodiment of the disclosure.

In operation 261, the server for managing an NFT for content may receive, from a first electronic device of a first user who has generated the target content, a request to issue the NFT for target content. In response to receiving, from the first electronic device, the request to issue the NFT for target content, the server may generate basic metadata on the target content.

In operation 262, the server may upload the generated basic metadata on the target content to a target folder generated in an IPFS. According to an example embodiment, the server may request the IPFS to generate the target folder for storing pieces of metadata on the NFT for target content. When receiving, from the server, the request to generate the target folder, the IPFS may generate the target folder for storing the pieces of metadata on the NFT for target content. The target folder may be a folder for managing the NFT for target content.

In operation 263, the server may generate first ownership metadata including a CID of the basic metadata on the target content uploaded to the target folder.

In operation 264, the server may obtain a first CID of the target folder updated with the first ownership metadata uploaded to the target folder.

In operation 265, the server may link the obtained first CID of the target folder to an NFT uniform resource identifier (URI) of the target content. The NFT URI may refer to a URI for obtaining information on an NFT for content. By linking the first CID of the target folder to the NFT URI of the target content, the server may allow external access to the target folder generated in the IPFS via the NFT URI of the target content.

Figure 2B:
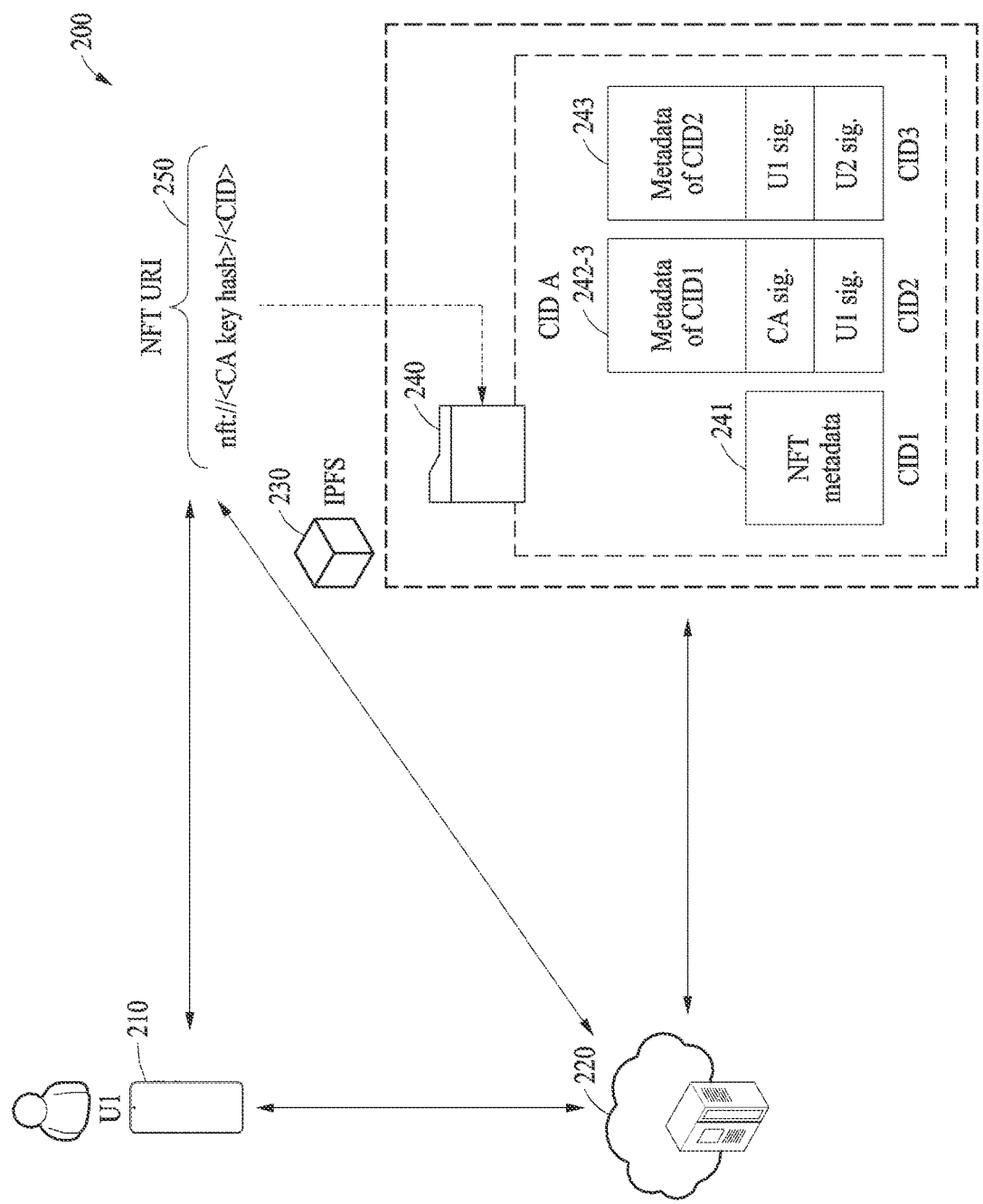
FIG. 2B is a diagram illustrating a system of managing an NFT for content, according to an embodiment of the disclosure.

FIG. 2B is a diagram illustrating a system of managing an NFT for content, according to an embodiment of the disclosure.

A system 200 of managing an NFT for content may issue the NFT for content and may allow anyone to verify an owner of the content. The system 200 of managing an NFT for content may assign ownership of the NFT to a creator or a buyer of the content.

The system 200 of managing an NFT for content may include a first electronic device 210 (e.g., the electronic device 101 of FIG. 1), a server 220 (e.g., the server 108 of FIG. 1), and an IPFS 230.

The first electronic device 210 may select target content for which an NFT may be issued. For example, the target content may be one of pieces of content stored in a memory (e.g., the memory 130 of FIG. 1) of the first electronic device 210 and pieces of content registered in the IPFS 230 and/or a web. However, examples are not limited to the foregoing examples. The first electronic device 210 may communicate with the server 220 and may transmit, to the server 220, a request to issue the NFT for the selected target content. The first user of the first electronic device 210 may be a creator of the NFT for target content and may be defined as a user having first ownership of the NFT for target content.

For example, the server 220 may be a content authentication server. When receiving, from the first electronic device 210 of the first user who has generated the target content, the request to issue the NFT for target content, the server 220 may issue the NFT for target content through the IPFS 230 and may assign the first ownership to the first user of the first electronic device 210. The server 220 may include a memory (e.g., the memory 130 of FIG. 1) for storing computer-executable instructions and a processor (e.g., the processor 120 of FIG. 1), and the processor may execute operations, described with reference to FIGS. 2A, 2B, 3, 4, 5, and 6, of the server 220. The server 220 may be expressed as an electronic device for managing an NFT for content.

According to an example embodiment, when receiving, from the first electronic device 210, the request to issue the NFT for target content, the server 220 may generate pieces of metadata on the NFT for target content. The server 220 may request the IPFS 230 to generate a target folder 240 for storing the pieces of metadata on the NFT for target content, and the IPFS 230 may generate the target folder 240 for storing the pieces of metadata on the NFT for target content. The server 220 may upload, to the target folder 240 generated by the IPFS 230, basic metadata 241 on the NFT of the target content and pieces of ownership metadata 242-3 and 243 on the NFT of the target content. In this case, the basic metadata 241 may refer to data on the NFT for target content. For example, the basic metadata 241 may have a metadata format on an NFT, such as an Ethereum Request for Comments (ERC)-721 format. The pieces of ownership metadata 242-3 and 243 may refer to data for verifying a history of ownership changes of the NFT for target content. According to an example embodiment, the server 220 may generate an NFT URI 250 of the target content and may link a CID of the target folder 240 to the generated NFT URI 250. According to an example embodiment, the server 220, through the IPFS 230, may issue the NFT for target content, transfer ownership of the NFT for target content, and/or verify the NFT for target content.

Figure 3:
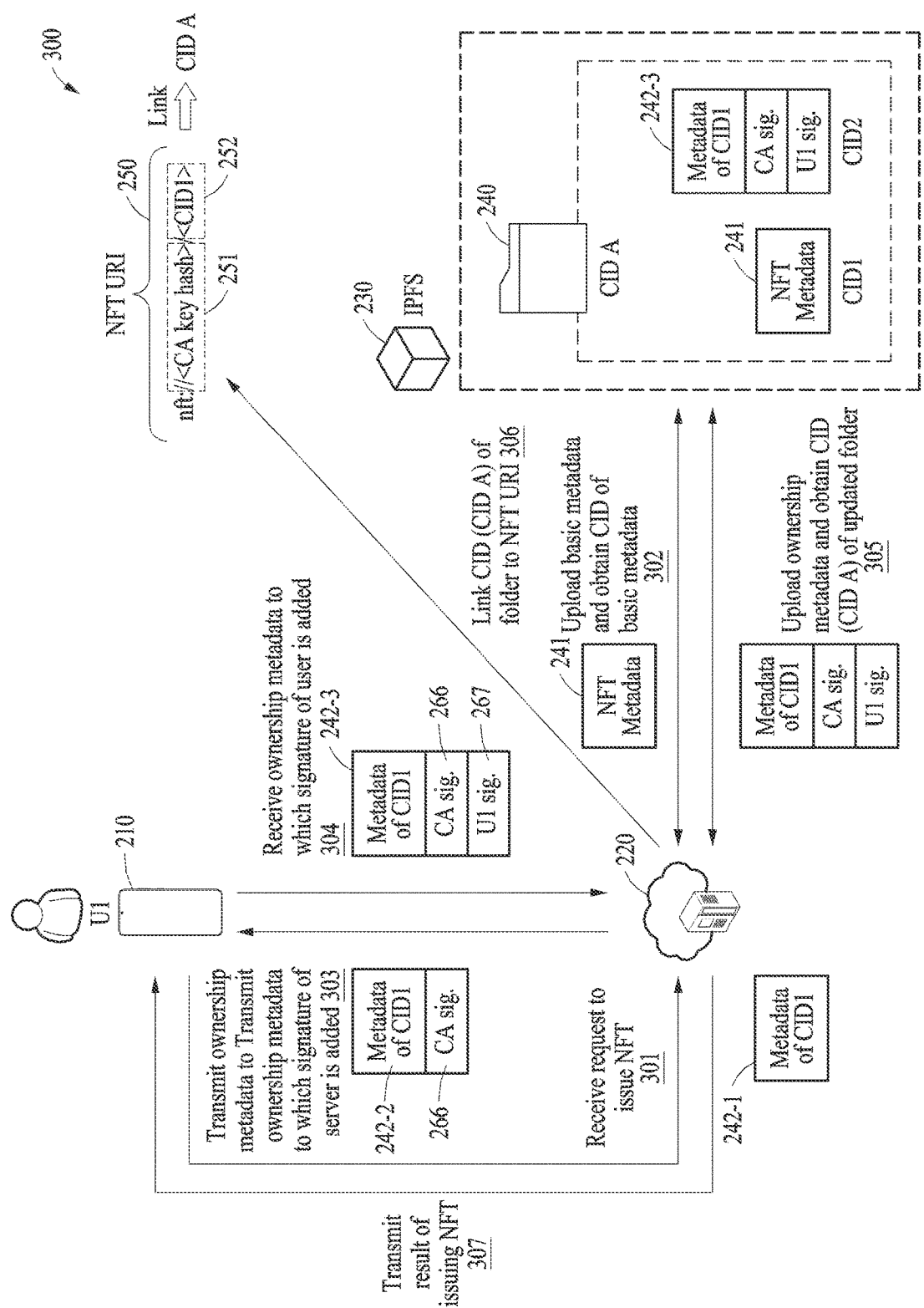
FIG. 3 is a diagram illustrating issuing an NFT for target content by a server for managing an NFT, according to an embodiment of the disclosure.

FIG. 3 is a diagram illustrating issuing an NFT for target content by a server for managing an NFT, according to an embodiment of the disclosure.

According to an example embodiment, as depicted in diagram 300, the server 220 may issue the NFT for target content. The server 220 may assign first ownership of the NFT for target content to a first user who has generated the target content.

In operation 301, the server 220 may receive, from the first electronic device 210 of the first user who has generated the target content, a request to issue the NFT for target content. In response to receiving, from the first electronic device 210, the request to issue the NFT for target content, the server 220 may generate the basic metadata 241 on the NFT for target content.

According to an example embodiment, the first electronic device 210 may select the target content for which the NFT may be issued. While transmitting, to the server 220, an address of the target content, the first electronic device 210 may request to issue the NFT for target content. For example, when the target content is registered in the IPFS 230, the first electronic device 210, while transmitting, to the server 220, an IPFS URI address, that is, a CID of the target content, may trigger issuing the NFT for target content. As another example, when the target content is registered in a web, the first electronic device 210, while transmitting, to the server 220, a hypertext transfer protocol (HTTP) URL address of the target content, may trigger issuing the NFT for target content. The first user of the first electronic device 210 that requests the server 220 to issue the NFT for target content may be a first owner of the NFT for target content. The first electronic device 210 may transmit, to the server 220, information on the target content, and the server 220 may receive, from the first electronic device 210, the information on the target content and may generate the basic metadata 241 on the NFT for target content. For example, the basic metadata 241 on the NFT for target content may include at least one of a title of the target content, a description on the target content, information on a type (e.g., a photo or a video) of the target content, and information on a generator of the basic metadata 241. According to an example embodiment, data included in the basic metadata 241 on the NFT for target content may vary depending on an NFT type.

In operation 302, the server 220 may request the IPFS 230 to generate the target folder 240 and may upload, to the target folder 240 generated by the IPFS 230, the basic metadata 241 on the NFT for target content. The server 220 may obtain, from the IPFS 230, a CID (e.g., a CID 1) of the basic metadata 241 uploaded to the target folder 240. In addition, to assign ownership to the first user of the first electronic device 210, the server 220 may generate ownership metadata 242-1 including the CID (e.g., the CID 1) of the basic metadata 241 uploaded to the target folder 240.

In operation 303, the server 220 may transmit, to the first electronic device 210 of the first user who is the first owner of the NFT for target content, ownership metadata 242-2 obtained by adding a signature 266 of the server 220 to the ownership metadata 242-1. For example, the server 220 may use a content authority key and add the signature 266 of the server 220 to the ownership metadata 242-1. Through the signature 266 of the server 220 that has been added to the ownership metadata 242-2, the NFT for target content may be verified as issued by the server 220.

In operation 304, the server 220 may receive, from the first electronic device 210, the ownership metadata 242-3 to which a signature 267 of the first user has been additionally added. According to an example embodiment, the first electronic device 210 may generate a pair of asymmetric keys to perform generating and trading an NFT. The first electronic device 210 may add the signature 267 of the first user to the ownership metadata 242-2 by using a private key of the generated pair of asymmetric keys and generate the ownership metadata 242-3. The first electronic device 210 may transmit, to the server 220, the ownership metadata 242-3 to which the signature 267 of the first user has been added. Through the signature 267 of the first user that has been added to the ownership metadata 242-3, the first user may be verified as the first owner of the NFT for target content.

In operation 305, the server 220 may upload, to the target folder 240, the ownership metadata 242-3 to which the signature 266 of the server 220 and the signature 267 of the first user are added and may obtain, from the IPFS 230, a first CID (e.g., a CID A) of the target folder 240 updated with the server 220 uploading the ownership metadata 242-3 to the target folder 240.

Since the IPFS 230 uses data itself as an address, a CID of a folder may change when the structure of the folder changes. When the server 220 uploads the ownership metadata 242-3 to the target folder 240, the structure of the target folder 240 may change, and accordingly, the CID of the target folder 240 may be updated. The IPFS 230 may transmit, to the server 220, the first CID (e.g., the CID A) of the changed target folder 240.

The server 220 may upload, to the target folder 240, the ownership metadata 242-3 to which the signature 267 of the first user is added and may assign ownership of the NFT for target content to the first user of the first electronic device 210.

In operation 306, the server 220 may link the obtained first CID to the NFT URI 250 of the target content.

According to an example embodiment, the server 220 may generate the NFT URI 250 of the target content. According to an example embodiment, the server 220 may generate the NFT URI 250, based on a public key of the server 220 and the CID of the basic metadata 241 on the NFT for target content. The server 220 may generate the NFT URI 250 by combining a hash value 251 of the public key of the server 220 with a CID 252 (e.g., the CID 1) of the basic metadata 241 on the NFT for target content. An NFT URI may be linked to a CID of a target folder including pieces of metadata (e.g., basic or ownership metadata) on an NFT for content. According to an example embodiment, the server 220 may link the first CID of the target folder 240 to the NFT URI 250 of the target content. A CID linked to the NFT URI 250 may only be modified in the server 220 for managing an NFT by using an asymmetric key technique.

The server 220 may upload, to the target folder 240, the basic metadata 241 and the ownership metadata 242-3 on the NFT for target content, may link the CID (e.g., the CID A) of the target folder 240 to the NFT URI 250 of the target content, and may thus complete issuing the NFT for target content.

In operation 307, the server 220 may transmit, to the first electronic device 210, a result of issuing the NFT for target content. For example, the server 220 may transmit, to the first electronic device 210, the CID (e.g., the CID A) of the target folder 240 that stores the pieces of metadata on the NFT for target content.

Figure 4:
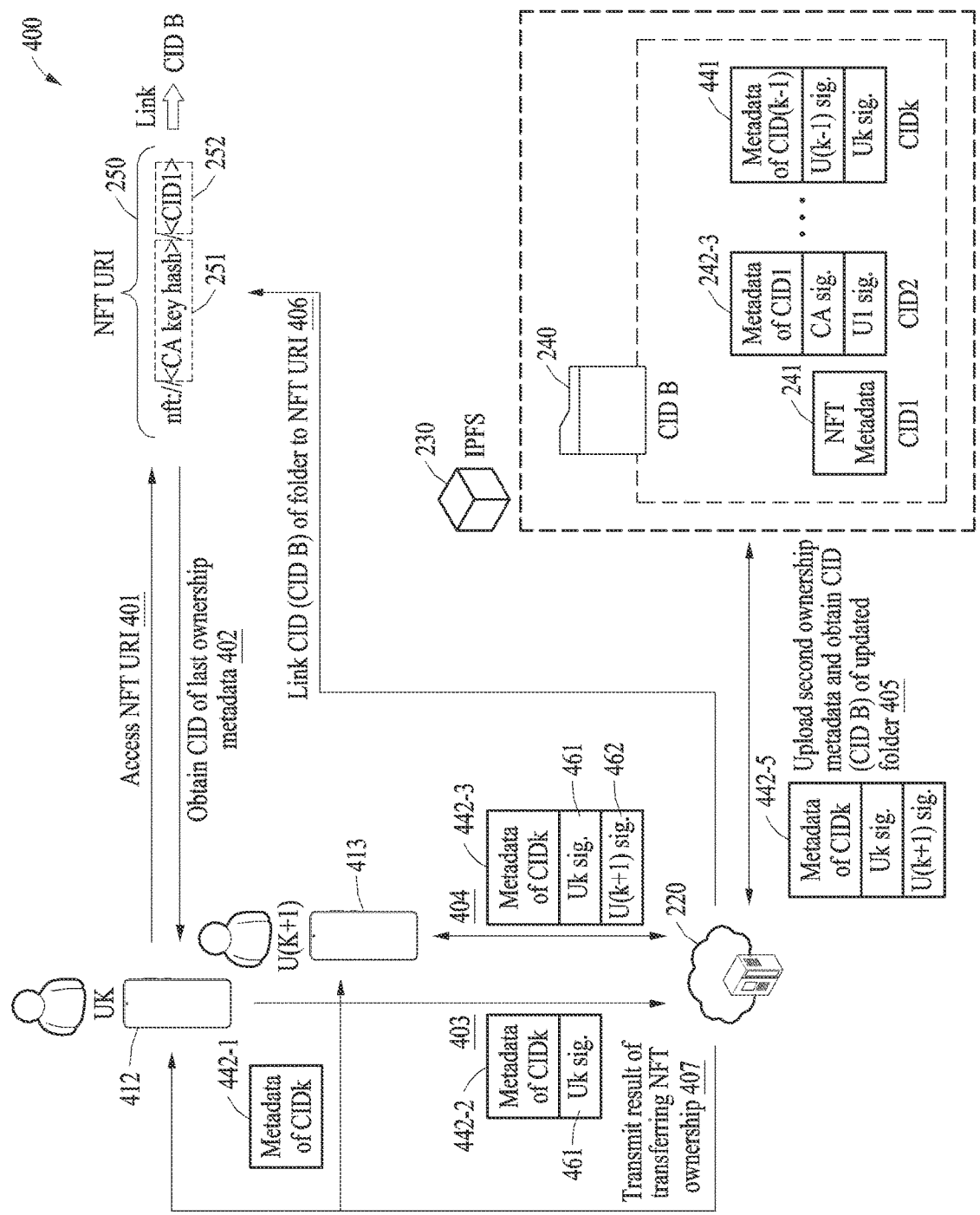
FIG. 4 is a diagram illustrating transferring an NFT for target content by a server for managing an NFT, according to an embodiment of the disclosure.

FIG. 4 is a diagram illustrating transferring an NFT for target content by a server for managing an NFT, according to an embodiment of the disclosure.

According to an example embodiment, as depicted in diagram 400, the server 220 may transfer ownership of the NFT for target content. Hereinafter, the ownership of the NFT for target content transferred from a current owner, which is a second user (e.g., Uk) of a second electronic device 412, to a third user (e.g., U(k+1)) of a third electronic device 413 is described as an example.

In operation 401, the second electronic device 412 may access the NFT URI 250 of the target content. According to an example embodiment, the second electronic device 412 of the second user having current ownership of the NFT for target content may access the NFT URI 250 to transfer the ownership of the NFT for target content. By using a public key of the server 220, which is an issuer of an NFT, and a CID (e.g., the CID 1) of basic metadata on the NFT for target content, the second electronic device 412 may access the NFT URI 250 of the target content. By combining a hash value of the public key of the server 220 with the CID (e.g., the CID 1) of the basic metadata 241 on the NFT for target content uploaded to the IPFS 230, the second electronic device 412 may predict and access the NFT URI 250 of the target content. Because the NFT URI 250 is linked to a current CID of the target folder 240 to which pieces of metadata on the NFT for target content are uploaded, based on the CID linked to the NFT URI 250, the second electronic device 412 may access the target folder 240 in the IPFS 230.

In operation 402, by accessing the target folder 240, the second electronic device 412 may identify last ownership metadata 441 among pieces of ownership metadata uploaded to the target folder 240 and may obtain, from the IPFS 230, a CID (e.g., a CID k) of the last ownership metadata 441. Last ownership metadata may be metadata for identifying a user having current ownership of the NFT for target content and may refer to metadata to which a signature of the user having the current ownership is added. According to an example embodiment, the second electronic device 412 may identify the last ownership metadata 441 to which a signature of the second user (e.g., the Uk) having the current ownership of the NFT for target content is added. According to an example embodiment, each piece of ownership metadata may include data on ownership change time. In this case, the second electronic device 412 may identify, as the last ownership metadata 441, ownership metadata having the latest ownership change time among pieces of ownership metadata 242-3 to 441 that are uploaded to the target folder 240.

According to another example embodiment, each of the pieces of ownership metadata 242-3 to 441 may directly include data on their sequence. Whenever the ownership of the NFT for target content is transferred, ownership metadata indicating ownership changes may be uploaded to the target folder 240, in which the ownership metadata includes data on a sequence determined based on the number of transferring of the ownership of the NFT for target content from the NFT for target content is issued until the ownership metadata is uploaded to the target folder 240. For example, the ownership metadata 242-3 may have a sequence number of 1 and the last ownership metadata 441 may have a sequence number of k. For example, k may be a natural number greater than or equal to 1.

According to an example embodiment, the second electronic device 412 may identify, as the last ownership metadata 441, ownership metadata having the last sequence number among the pieces of ownership metadata 242-3, . . ., 441 that are uploaded to the target folder 240.

Accordingly, the second electronic device 412 may verify the basic metadata 241 and the pieces of ownership metadata 242-3 to 441 that are uploaded to the target folder 240. The second electronic device 412 for verifying the basic metadata 241 and the pieces of ownership metadata 242-3 to 441 is described below with reference to FIG. 6. By verifying the basic metadata 241 and the pieces of ownership metadata 242-3 to 441 that are uploaded to the target folder 240, the second electronic device 412 may verify that the NFT for target content is an NFT of which history is not modulated. After verifying the pieces of metadata (e.g., the basic metadata 241 and the pieces of ownership metadata 242-3 to 441), the second electronic device 412 may obtain, from the IPFS 230, the CID (e.g., the CID k) of the last ownership metadata 441 uploaded to the target folder 240.

In operation 403, the second electronic device 412 may generate second ownership metadata 442-1 including the CID (e.g., the CID k) of the last ownership metadata 441 and may add, to the generated second ownership metadata 442-1, a signature 461 of the second user having current ownership of the NFT for target content. The second electronic device 412 may transmit, to the server 220, second ownership metadata 442-2 to which the signature 461 of the second user has been added. According to an example embodiment, by using a private key of the second user (e.g., the Uk), the second electronic device 412 may add the signature 461 of the second user to the second ownership metadata 442-1. Through the signature 461 of the second user that has been added to the second ownership metadata 442-2, transferring the ownership of the NFT for target content may be verified as agreed by the second user.

The server 220 may receive, from the second electronic device 412 of the second user having the current ownership of the NFT for target content, the second ownership metadata 442-2 including the CID (e.g., the CID k) of the last ownership metadata 441 uploaded to the target folder 240 and the signature 461 of the second user.

In operation 404, the server 220 may transfer, to the third electronic device 413 of the third user U(k+1) to receive the ownership of the NFT for target content, the CID of the last ownership metadata 441 and the signature 461 of the second user, and may receive, from the third electronic device 413, second ownership metadata 442-3 to which a signature 462 of the third user U(k+1) has been additionally added. For example, the second ownership metadata 442-2 may include an identification value of the third user U(k+1) who is to receive the ownership of the NFT for target content, and the server 220, by using the identification value of the third user U(k+1), which is the next owner included in the second ownership metadata 442-2, may transfer the second ownership metadata 442-2 to the third electronic device 413 of the third user U(k+1).

The server 220 may identify the third electronic device 413 corresponding to the third user U(k+1). For example, the server 220 may have stored connection information between a user and an electronic device, and by using the stored connection information, may identify the third electronic device 413 corresponding to the third user U(k+1). As another example, the second electronic device 412 of the second user Uk and the third electronic device 413 of the third user U(k+1) may communicate with each other, and with the second user Uk transmitting information on the third electronic device 413 of the third user U(k+1), the server 220 may identify the third electronic device 413 of the third user U(k+1).

According to an example embodiment, to additionally add, to the second ownership metadata 442-2, the signature 462 of the third user U(k+1) who is to receive the ownership of the NFT for target content, other than the signature 461 of the second user transferring the ownership of the NFT for target content, the server 220 may transmit, to the third electronic device 413 of the third user U(k+1), the second ownership metadata 442-2 to which the signature 461 of the second user has been added. By using a private key of the third user U(k+1), the third electronic device 413 may additionally add the signature 462 of the third user U(k+1) to the second ownership metadata 442-2 and may transmit, to the server 220, the second ownership metadata 442-3 to which the signature 462 of the third user U(k+1) is additionally added.

In operation 405, the server 220 may upload, to the target folder 240 in the IPFS 230, the second ownership metadata 442-3 to which the signature 461 of the second user who has the current ownership of the NFT for target content and the signature 462 of the third user U(k+1) who is to receive the ownership of the NFT for target content have been added. The server 220 may obtain a second CID (e.g., a CID B) of the target folder 240 updated with the server 220 uploading the second ownership metadata 442-3 to the target folder 240. When the server 220 uploads the second ownership metadata 442-3 to the target folder 240, the structure of the target folder 240 may change, and accordingly, the CID of the target folder 240 may change. The IPFS 230 may transmit, to the server 220, the second CID (e.g., the CID B) of the changed target folder 240.

In operation 406, the server 220 may link the second CID obtained from the IPFS 230 to the NFT URI 250 of the target content. According to an example embodiment, the server 220 may unlink a CID previously linked to the NFT URI 250 of the target content. While unlinking the CID previously linked to the NFT URI 250 of the target content, the server 220 may link, to the NFT URI 250, the second CID, which is an updated CID of the target folder 240.

In operation 407, the server 220 may transmit a result of transferring the ownership of the NFT for target content to each of the second electronic device 412 and the third electronic device 413. For example, the server 220 may transmit, to each of the second and third electronic devices 412 and 413, the updated CID (e.g., the CID B) of the target folder 240 storing pieces of metadata on the NFT for target content.

Figure 5:
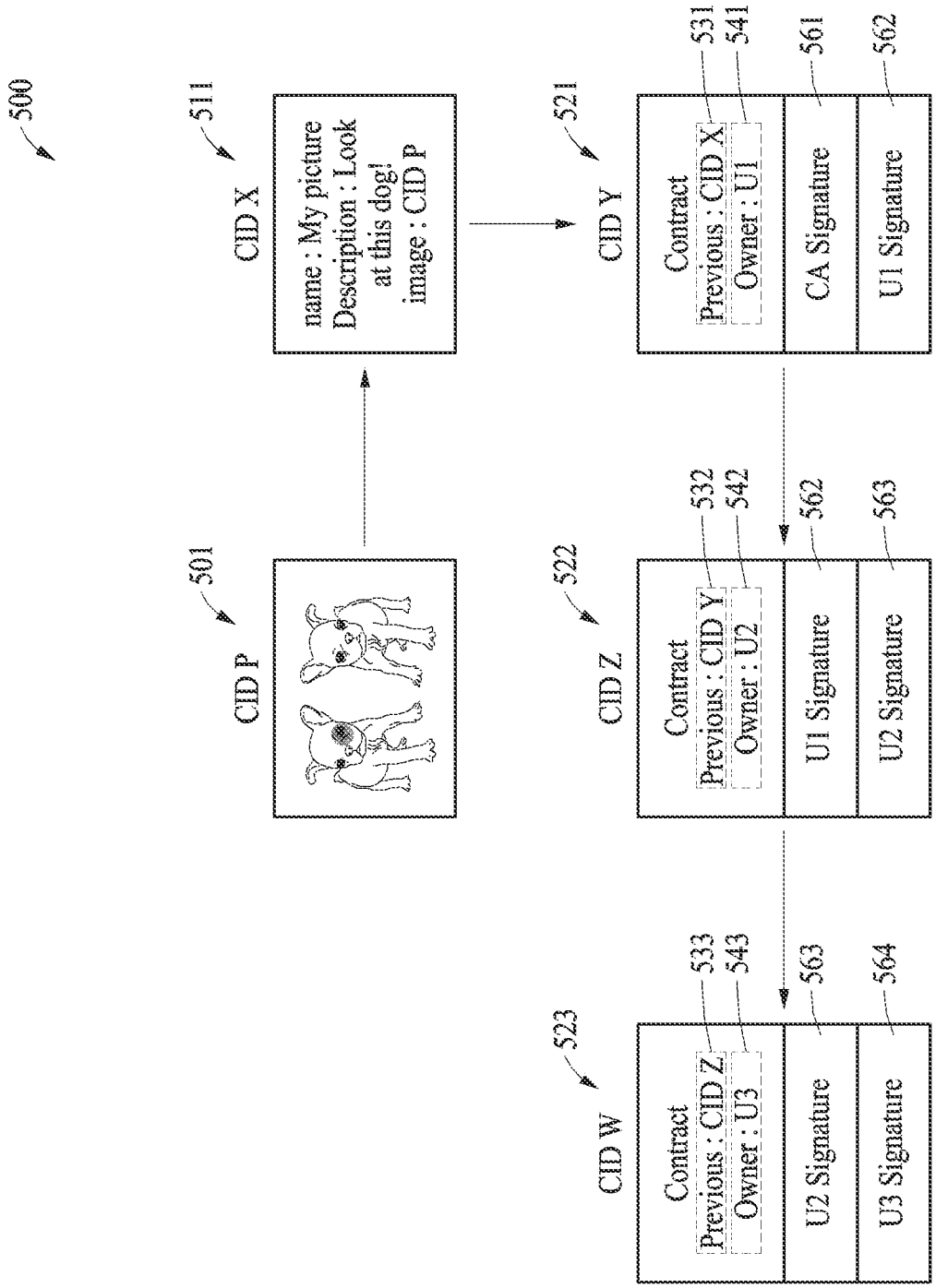
FIG. 5 is a diagram illustrating pieces of metadata on target content that are uploaded to a target folder in an interplanetary file system (IPFS), according to an embodiment of the disclosure.

FIG. 5 is a diagram illustrating pieces of metadata on target content that are uploaded to a target folder in an IPFS, according to an embodiment of the disclosure.

According to an example embodiment, as depicted in diagram 500, in response to receiving a request to issue an NFT for target content 501 from a first electronic device (e.g., the electronic device 101) of a first user who has generated the target content 501, a server (e.g., the server 220) may generate basic metadata 511 on the NFT for target content 501. Hereinafter, the target content 501 is assumed to be pre-registered in an IPFS (e.g., the IPFS 230). The server may receive, from the first electronic device, a CID (e.g., a CID P) of the target content 501 uploaded to the IPFS together with the request to issue the NFT for target content 501. By using the CID (e.g., the CID P) of the target content 501, the server may generate the basic metadata 511 on the NFT for target content 501.

According to an example embodiment, the basic metadata 511 on the NFT for target content 501, which is generated by the server, may include the CID (e.g., the CID P) of the target content 501 registered in the IPFS. For example, the basic metadata 511 on the NFT for target content 501 may include information of a name of the target content 501 and/or a description on the target content 501.

According to an example embodiment, to manage a history of ownership changes of the NFT for target content 501, the server may upload pieces of first, second, and third ownership metadata 521, 522, and 523 to the target folder in the IPFS.

According to an example embodiment, each of the pieces of first, second, and third ownership metadata 521, 522, and 523 on the NFT for target content 501 may include a CID of a previous piece of ownership metadata. The first ownership metadata 521 may include a CID of the basic metadata 511 on the NFT for target content 501. Pieces of ownership metadata may each include a CID of a previous piece of ownership metadata and may thus be connected to each other in a chain. For example, the first ownership metadata 521 may include a CID 531 (e.g., a CID X) of the basic metadata 511 on the NFT for target content 501. The second ownership metadata 522 may include a CID 532 (e.g., a CID Y) of the first ownership metadata 521 that is before the second ownership metadata 522. The third ownership metadata 523 may include a CID 533 (e.g., a CID Z) of the second ownership metadata 522 that is before the third ownership metadata 523.

According to an example embodiment, each of the pieces of first, second, and third ownership metadata 521, 522, and 523 on the NFT for target content 501 may include an address of a user who receives ownership of the NFT for target content 501 when each of the pieces of first, second, and third ownership metadata 521, 522, and 523 is uploaded to the target folder. The first ownership metadata 521 may include an address of a user who is the first owner of the NFT for target content 501. An address of a user may refer to a unique address for identifying the user. For example, an electronic device of the user may generate a pair of asymmetric keys to generate an NFT for target content or perform a transaction, and by using a hash value of a public key of the pair of asymmetric keys, may generate the address of the user. Through a user's address included in ownership metadata, the user having ownership of an NFT issued by the server may be identified. A user having current ownership of the NFT for target content may be identified through the user's address included in the last piece of ownership metadata uploaded to the target folder. For example, the first ownership metadata 521 may include an address 541 of a user U1 having the first ownership of the NFT for target content 501. The second ownership metadata 522 may include an address 542 of a user U2 who receives, from the user U1, the ownership of the NFT for target content 501. The third ownership metadata 523 may include an address 543 of a user U3 who receives, from the user U2, the ownership of the NFT for target content 501.

According to an example embodiment, each of the pieces of first, second, and third ownership metadata 521, 522, and 523 on the NFT for target content 501 may include a signature of a user who transfers the ownership of the NFT for target content 501 and a signature of a user who receives the ownership of the NFT for target content 501 when each of the pieces of first, second, and third ownership metadata 521, 522, and 523 is uploaded to the target folder. For example, the first ownership metadata 521 may include a signature (CA signature) 561 of the server for issuing the NFT for target content 501 and a signature (U1 signature) 562 of the user U1 having the first ownership of the NFT for target content 501. The second ownership metadata 522 may include the signature (U1 signature) 562 of the user U1 who transfers the ownership of the NFT for target content 501 and a signature (U2 signature) 563 of the user U2 who receives the ownership of the NFT for target content 501 when the second ownership metadata 522 is uploaded to the target folder. The third ownership metadata 523 may include the signature (U2 signature) 563 of the user U2 who transfers the ownership of the NFT for target content 501 and a signature (U3 signature) 564 of the user U3 who receives the ownership of the NFT for target content 501 when the third ownership metadata 523 is uploaded to the target folder.

According to an example embodiment, each of the pieces of first, second, and third ownership metadata 521, 522, and 523 on the NFT for target content 501 may further include information, such as time of ownership transfer, a transaction platform, and/or a transaction amount.

Figure 6:
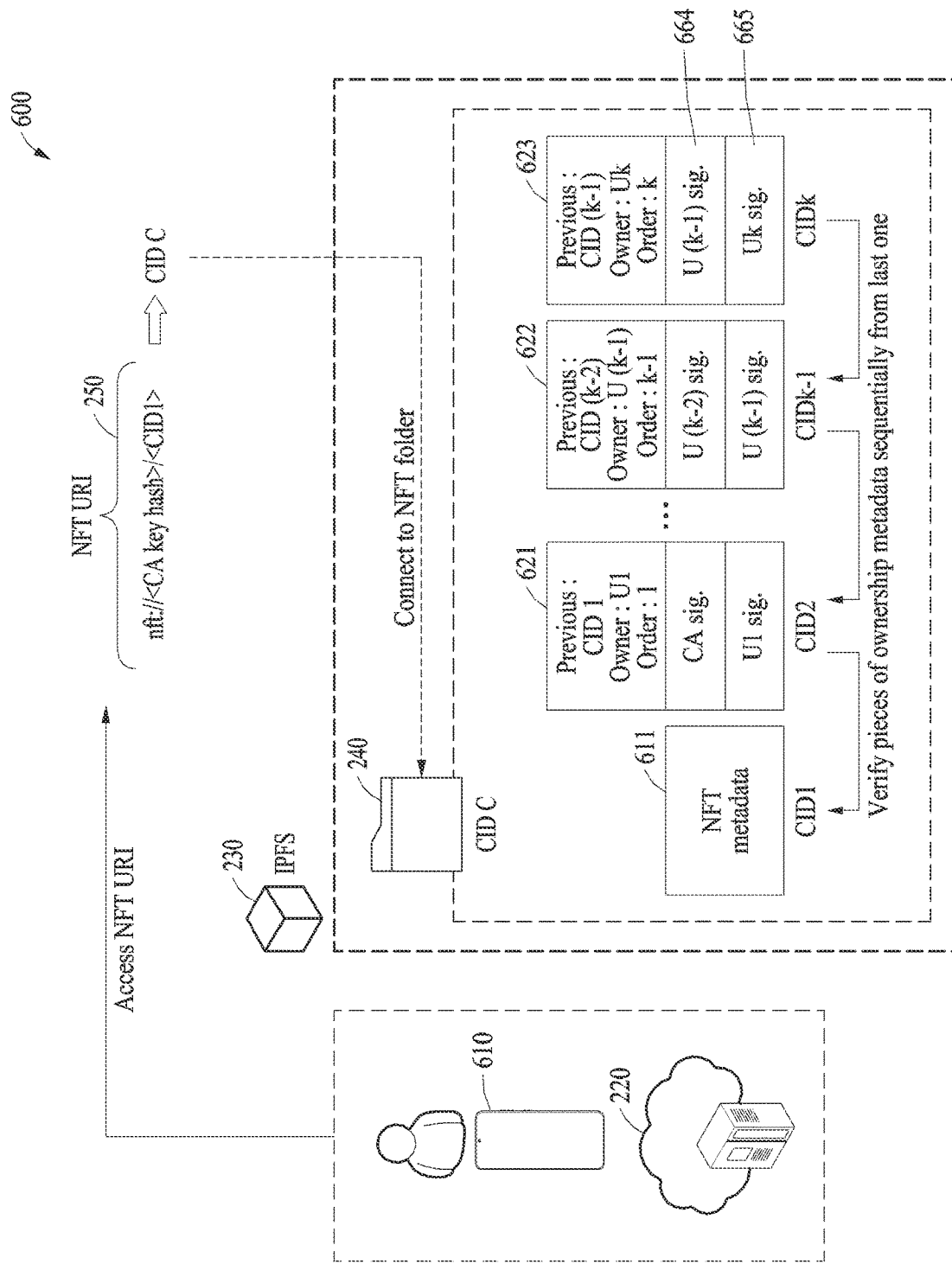
FIG. 6 is a diagram illustrating verifying an NFT for target content by a server for managing an NFT, according to an embodiment of the disclosure.

FIG. 6 is a diagram illustrating verifying an NFT for target content by a server for managing an NFT, according to an embodiment of the disclosure.

As depicted in diagram 600, an electronic device 610 (e.g., an electronic device 101) of a user or a server 220 may verify the NFT for target content. The electronic device 610 or the server 220 may access the NFT URI 250 of the target content and may verify pieces of metadata (e.g., basic metadata 611 and pieces of ownership metadata 621, 622, and 623) on the NFT for target content uploaded to the target folder 240 in the IPFS 230. Although the description on the server 220 verifying the NFT for target content is mainly provided hereinafter, a component for verifying the NFT for target content is not limited to the server 220, and as described above, the electronic device 610 of the user may also verify the NFT for target content.

First, the server 220 may access the NFT URI 250 of the target content. According to an example embodiment, the server 220 may access the NFT URI 250 of the target content by using a public key of the server 220 and a CID (e.g., the CID 1) of the basic metadata 611 on the NFT for target content. According to an example embodiment, the server 220 may access the target folder 240 to which the pieces of metadata on the NFT for target content are uploaded through a CID (e.g., a CID C) linked to the NFT URI 250. The server 220 may obtain the basic metadata 611 and the pieces of ownership metadata 621, 622, and 623 that are uploaded to the target folder 240 and may verify each of the obtained basic metadata 611 and the obtained pieces of ownership metadata 621, 622, and 623.

First, an operation of verifying the pieces of ownership metadata 621, 622, and 623 by the server 220 is described. According to an example embodiment, the server 220 may verify each of the obtained pieces of ownership metadata 621, 622, and 623 sequentially from the last piece of ownership metadata, which is the ownership metadata 623. For example, the server 220 may verify pieces of ownership metadata sequentially from the latest piece to the earliest piece. After verifying a certain piece of ownership metadata, the server 220 may verify ownership metadata indicated by a CID included in the certain piece of ownership metadata.

According to an example embodiment, the server 220 may restore public keys used in users' signatures, based on the users' signatures included in the certain piece of ownership metadata to verify the certain piece of ownership metadata among the obtained pieces of ownership metadata 621, 622, and 623. The server 220 may verify each of a user's address included in ownership metadata that is before the certain piece of ownership metadata, a user's address included in the certain piece of ownership metadata, and the users' signatures included in the certain piece of ownership metadata by using the restored public keys and may complete verifying the certain piece of ownership metadata by verifying all the users' signatures and the users' addresses by using the restored public keys. For example, a user's signature may be added to ownership metadata through an elliptic curve digital signature algorithm (ECDSA). For example, the user's signature may be generated by adding a v value to r and s values, which are default signature values of the ECDSA, and the generated user's signature may be added to the ownership metadata. Maximum two candidate public keys that may be a public key of a user may be derived by using the r and s values, which are the default signature values, and the public key of the user may be derived, of the two candidate public keys, by using the v value. In other words, the public key used in the user's signature may be restored, only by using the user's signature itself, through the r, s, and v values of the user's signature.

For example, the server 220 may verify the last piece of ownership metadata, which is the ownership metadata 623. First, the server 220 may restore a public key of a user Uk that is used in a signature 665 of the user Uk, based on the signature 665 of the user Uk who receives ownership when the ownership metadata 623 is uploaded to the target folder 240 among signatures of the user Uk included in the ownership metadata 623. By using the restored public key of the user Uk, the server 220 may verify the signature 665 of the user Uk included in the ownership metadata 623. In addition, the server 220 may derive an address of the user Uk by using the restored public key of the user Uk. For example, the server 220 may derive the address of the user Uk by hashing the restored public key of the user Uk. By determining whether the derived address of the user Uk matches an address of the user Uk included in the ownership metadata 623, the server 220 may verify the address of the user Uk included in the ownership metadata 623. Second, the server 220 may verify a public key of a user U(k−1) that is used in a signature 664 of the user U(k−1), based on the signature 664 of the user U(k−1) who transfers the ownership when the ownership metadata 623 is uploaded to the target folder 240 among the signatures included in the ownership metadata 623. By using the restored public key of the user U(k−1), the server 220 may verify the signature 664 of the user U(k−1) included in the ownership metadata 623. By using the restored public key of the user U(k−1), the server 220 may derive an address of the user U(k−1) and may determine whether the derived address of the user U(k−1) matches an address of the user U(k−1) included in the ownership metadata 622 that is before the ownership metadata 623. For example, the server 220 may verify the ownership metadata 622 that is before the ownership metadata 623 through a CID (e.g., a CID (k−1)) included in the ownership metadata 623. In summary, the server 220 may complete verifying the ownership metadata 623 by verifying the signature 665 of the user Uk and the signature 664 of the user U(k−1) that are included in the ownership metadata 623 and the address of the user U(k−1) that is included in the ownership metadata 622. Thereafter, the server 220 may verify the ownership metadata 622 based on the ownership metadata 623.

According to an example embodiment, the server 220 may also verify the basic metadata 611 on the NFT for target content. According to an example embodiment, the server 220 may verify the basic metadata 611 by determining whether a CID included in the basic metadata 611 matches a CID of the target content registered in the IPFS 230.

According to an example embodiment, the server 220 may verify the integrity of the history of the NFT for target content by verifying the basic metadata 611 and the pieces of ownership metadata 621, 622, and 623.

According to an example embodiment, an apparatus for managing an NFT for content includes a memory for storing computer-executable instructions and a processor for executing the computer-executable instructions by accessing the memory, in which, when the computer-executable instructions are executed by the processor, the processor is configured to, in response to receiving a request to issue an NFT for target content from a first electronic device of a first user who has generated the target content, generate basic metadata on the target content, upload the generated basic metadata to a target folder generated in an IPFS, generate first ownership metadata including a CID of the uploaded basic metadata, obtain a first CID of the target folder that is updated with the first ownership metadata uploaded to the target folder, and link the obtained first CID of the target folder to an NFT URI of the target content.

The computer-executable instructions may be configured to generate the NFT URI of the target content, based on a public key of a server and the CID of the uploaded basic metadata.

When the computer-executable instructions are executed by the processor, the processor may be configured to transmit, to the first electronic device, the first ownership metadata with a signature of the server added and receive, from the first electronic device, the first ownership metadata with a signature of the first user additionally added.

When the computer-executable instructions are executed by the processor, the processor may be configured to receive, from a second electronic device of a second user having current ownership of the NFT for target content, second ownership metadata including a CID of the latest uploaded ownership metadata to the target folder, obtain a second CID of the target folder updated with the second ownership metadata uploaded to the target folder, and link the obtained second CID of the target folder to the NFT URI of the target content.

When the computer-executable instructions are executed by the processor, the processor may be configured to receive, from a second electronic device of a second user having current ownership of the target content, second ownership metadata including a CID of the latest uploaded ownership metadata to the target folder, obtain a second CID of the target folder updated with the second ownership metadata uploaded to the target folder, and link the obtained second CID of the target folder to the NFT URI of the target content.

When the computer-executable instructions are executed by the processor, the processor may be configured to link the obtained second CID of the target folder to the NFT URI of the target content while unlinking the previously linked CID to the NFT URI of the target content.

When the computer-executable instructions are executed by the processor, the processor may be configured to obtain the basic metadata and pieces of ownership metadata that have been uploaded to the target folder and verify the obtained basic metadata and each of the obtained pieces of ownership metadata.

When the computer-executable instructions are executed by the processor, the processor may be configured to verify each piece of obtained ownership metadata sequentially from the latest uploaded ownership metadata.

When the computer-executable instructions are executed by the processor, the processor may be configured to, based on a user's signatures included in ownership metadata of obtained pieces of ownership metadata, restore public keys used in a signature of the user, and by using the restored public keys, verify each of the user's signatures included in the ownership metadata, an address of the user included in the ownership metadata, and an address of the user included in ownership metadata that has been uploaded prior to the ownership metadata.

When the computer-executable instructions are executed by the processor, the processor may be configured to verify that a CID of the target content registered in the IPFS is the same as the CID included in the obtained basic metadata.

According to an example embodiment, a method, performed by a server, of managing an NFT for content including, in response to receiving a request to issue an NFT for target content from a first electronic device of a first user who has generated the target content, generating basic metadata on the target content, uploading the generated basic metadata to a target folder generated in an IPFS, generating first ownership metadata including a CID of the uploaded basic metadata, obtaining a first CID of the target folder with the first ownership metadata uploaded to the target folder, and linking the obtained first CID of the target folder to an NFT URI of the target content.

The linking the obtained first CID of the target folder to the NFT URI of the target content may include generating the NFT URI of the target content, based on a public key of a server and the CID of the uploaded basic metadata.

The generating the first ownership metadata may include transmitting, to the first electronic device, the first ownership metadata with a signature of the server added and receiving, from the first electronic device, the first ownership metadata with a signature of the first user additionally added.

The method, performed by a server, of managing the NFT for content may further include receiving, from a second electronic device of a second user having current ownership of the NFT on the target content, second ownership metadata comprising a CID of the latest uploaded ownership metadata to the target folder, obtaining a second CID of the target folder updated with the second ownership metadata uploaded to the target folder, and linking the obtained second CID of the target folder to the NFT URI of the target content.

The receiving the second ownership metadata may include receiving, from the second electronic device, the second ownership metadata with a signature of the second user added, transmitting, to a third electronic device of a third user to receive ownership of the NFT for target content, the received second ownership metadata, and receiving, from the third electronic device, the second ownership metadata with a signature of the third user additionally added.

The linking the obtained second CID of the target folder to the NFT URI of the target content may include linking the obtained second CID of the target folder to the NFT URI of the target content while unlinking the previously linked CID to the NFT URI of the target content.

The method, performed by a server, of managing the NFT for content may further include accessing the target folder through a CID linked to the NFT URI of the target content and obtaining the basic metadata and pieces of ownership metadata that have been uploaded to the target folder and verifying the obtained basic metadata and each of the obtained pieces of ownership metadata.

The verifying may include verifying each piece of obtained ownership metadata sequentially from the latest uploaded ownership metadata.

The verifying may include restoring public keys used in a signature of a user, based on the user's signatures comprised in ownership metadata, to verify the ownership metadata of the obtained pieces of ownership metadata, and by using the restored public keys, verifying each of the user's signatures comprised in the ownership metadata, an address of the user comprised in the ownership metadata, and an address of the user comprised in ownership metadata that has been uploaded prior to the ownership metadata.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus for managing a non-fungible token (NFT) for content, the apparatus comprising:
    memory storing one or more computer programs; and
    one or more processors communicatively coupled to the memory,
    wherein the one or more computer programs include computer-executable instructions that, when executed by the one or more processors individually or collectively, cause the apparatus to:
        in response to receiving a request to issue an NFT for target content from a first electronic device of a first user who has generated the target content, generate basic metadata on the target content,
        upload the generated basic metadata to a target folder generated in an interplanetary file system (IPFS),
        generate first ownership metadata comprising a content identifier (CID) of the uploaded basic metadata, wherein signature of the first user is added to the first ownership metadata,
        upload the first ownership metadata to the target folder,
        in response to ownership of the NFT being transferred from the first user to a second user, obtain second ownership metadata, wherein signatures of the first user and the second user are added to the second ownership metadata,
        upload the second ownership metadata to the target folder,
        obtain the basic metadata, the first ownership metadata, and the second ownership metadata,
        in response to identifying the second ownership metadata as latest uploaded ownership metadata of the NFT, verify the second ownership metadata, by verifying the signatures of the first user and the second user comprised in the second ownership metadata,
        after completing verifying the second ownership metadata and based on the first ownership metadata being sequentially before the second ownership metadata, verify the first ownership metadata, by verifying the signature of the first user comprised in the first ownership metadata, and
        after completing verifying ownership metadata, verify the basic metadata.

2. The apparatus of claim 1, wherein the one or more computer programs further include computer-executable instructions that, when executed by the one or more processors individually or collectively, cause the apparatus to:
generate an NFT uniform resource identifier (URI) of the target content, based on a public key of a server and the CID of the uploaded basic metadata.

3. The apparatus of claim 1, wherein the one or more computer programs further include computer-executable instructions that, when executed by the one or more processors individually or collectively, cause the apparatus to:
transmit, to the first electronic device, the first ownership metadata with a signature of a server added; and
receive, from the first electronic device, the first ownership metadata with a signature of the first user additionally added.

4. The apparatus of claim 2, wherein the one or more computer programs further include computer-executable instructions that, when executed by the one or more processors individually or collectively, cause the apparatus to:
receive, from another electronic device of another user having current ownership of the NFT for target content, additional ownership metadata comprising a CID of latest uploaded ownership metadata to the target folder; and
in response to uploading the additional ownership metadata to the target folder, obtain a second CID of the target folder by updating the CID of the target folder with the additional ownership metadata.

5. The apparatus of claim 4, wherein the one or more computer programs further include computer-executable instructions that, when executed by the one or more processors individually or collectively, cause the apparatus to:
receive, from the another electronic device, the additional ownership metadata with a signature of the another user added;
transmit, to another electronic device of another user to receive ownership of the NFT for target content, the received additional ownership metadata; and
receive, from the another electronic device, the additional ownership metadata with a signature of the another user additionally added.

6. The apparatus of claim 4, wherein the one or more computer programs further include computer-executable instructions that, when executed by the one or more processors individually or collectively, cause the apparatus to:
link the obtained second CID of the target folder to the NFT URI of the target content.

7. The apparatus of claim 1,
wherein the first ownership metadata comprises an address of the first user,
wherein the second ownership metadata comprises an address of the second user, and
wherein the one or more computer programs further include computer-executable instructions that, when executed by the one or more processors individually or collectively, cause the apparatus to:
verify the address of the second user, based on whether the address of the second user matches a hash value of public key of the second user, wherein the public key of the second user is restored based on the signature of the second user comprised in the second ownership metadata,
verify the address of the first user, based on the whether a hash value of public key of the first user matches the address of the first user comprised in the first ownership metadata, wherein the public key of the first user is restored based on the signature of the first user comprised in the second ownership metadata, and
in response to verifying signatures of the first user and the second user comprised in the second ownership metadata and verifying addresses of the first user and the second user, complete verifying the second ownership metadata.

8. The apparatus of claim 1,
wherein the second ownership metadata comprises a CID of the first ownership metadata, and
wherein the one or more computer programs further include computer-executable instructions that, when executed by the one or more processors individually or collectively, cause the apparatus to:
identify that the first ownership metadata is sequentially before the second ownership metadata through the CID of the first ownership metadata comprised in the second ownership metadata.

9. The apparatus of claim 1,
wherein the first ownership metadata comprises a CID of the basic metadata, and
wherein the one or more computer programs further include computer-executable instructions that, when executed by the one or more processors individually or collectively, cause the apparatus to:
identify that the basic metadata is sequentially before the first ownership metadata through the CID of the basic metadata comprised in the first ownership metadata.

10. The apparatus of claim 1,
wherein the basic metadata comprising a CID of the target content, and
wherein the one or more computer programs further include computer-executable instructions that, when executed by the one or more processors individually or collectively, cause the apparatus to:
verify the basic metadata based on whether the CID of the target content matches a CID of the target content registered in the IPFS.

11. The apparatus of claim 1, wherein the one or more computer programs further include computer-executable instructions that, when executed by the one or more processors individually or collectively, cause the apparatus to:
verify the signature of the first user comprised in the second ownership metadata using a second public key of the first user, wherein the second public key of the first user is restored based on the signature of the first user comprised in the second ownership metadata, and
verify the signature of the first user comprised in the first ownership metadata using first public key of the first user, wherein the first public key of the first user is restored based on the signature of the first user comprised in the first ownership metadata.

12. The apparatus of claim 11,
wherein the signatures of the first user comprised in the first ownership metadata and the second ownership metadata, is added through elliptic curve digital signature algorithm (ECDSA), and
wherein the one or more computer programs further include computer-executable instructions that, when executed by the one or more processors individually or collectively, cause the apparatus to:
restore the second public key of the first user, only by using the signature of first user comprised in the second ownership itself, and restore the first public key of the first user, only by using the signature of first user comprised in the first ownership itself.

13. The apparatus of claim 2, wherein the one or more computer programs further include computer-executable instructions that, when executed by the one or more processors individually or collectively, cause the apparatus to:
in response to uploading the first ownership metadata to the target folder, obtain a first CID of the target folder by updating a CID of the target folder with the first ownership metadata,
link the obtained first CID of the target folder to an NFT uniform resource identifier (URI) of the target content,
in response to uploading the second ownership metadata to the target folder, obtain second CID of the target folder by updating a CID of the target folder with the second ownership metadata,
unlink a previously linked the first CID to the NFT URI of the target content, and
link the obtained second CID of the target folder to the NFT URI of the target content.

14. A method, performed by a server, of managing a non-fungible token (NFT) for content, the method comprising:
in response to receiving a request to issue an NFT for target content from a first electronic device of a first user who has generated the target content, generating basic metadata on the target content;
uploading the generated basic metadata to a target folder generated in an interplanetary file system (IPFS);
generating first ownership metadata comprising a content identifier (CID) of the uploaded basic metadata, wherein signature of the first user is added to the first ownership metadata;
uploading the first ownership metadata to the target folder;
in response to ownership of the NFT being transferred from the first user to a second user, obtaining second ownership metadata, wherein signatures of the first user and the second user are added to the second ownership metadata;
uploading the second ownership metadata to the target folder;
obtaining the basic metadata, the first ownership metadata, and the second ownership metadata;
in response to identifying the second ownership metadata as latest uploaded ownership metadata of the NFT, verifying the second ownership metadata, by verifying the signatures of the first user and the second user comprised in the second ownership metadata;
after completing verifying the second ownership metadata and based on the first ownership metadata being sequentially before the second ownership metadata, verifying the first ownership metadata, by verifying the signature of the first user comprised in the first ownership metadata; and
after completing verifying ownership metadata, verifying the basic metadata.

15. The method of claim 14,
wherein first ownership metadata comprises an address of the first user,
wherein the second ownership metadata comprises an address of the second user, and
wherein the verifying the second ownership metadata comprises:
verifying the address of the second user, based on whether the address of the second user matches a hash value of public key of the second user, wherein the public key of the second user is restored based on the signature of the second user comprised in the second ownership metadata,
verifying the address of the first user, based on the whether a hash value of public key of the first user matches the address of the first user comprised in the first ownership metadata, wherein the public key of the first user is restored based on the signature of the first user comprised in the second ownership metadata, and
in response to verifying signatures of the first user and the second user comprised in the second ownership metadata and verifying addresses of the first user and the second user, completing verifying the second ownership metadata.

16. The method of claim 15,
wherein the second ownership metadata comprises a CID of the first ownership metadata, and
wherein the method further comprises:
identifying that the first ownership metadata is sequentially before the second ownership metadata through the CID of the first ownership metadata comprised in the second ownership metadata.

17. The method of claim 16,
wherein the first ownership metadata comprises a CID of the basic metadata, and
wherein the method further comprises:
identifying that the basic metadata is sequentially before the first ownership metadata through the CID of the basic metadata comprised in the first ownership metadata.

18. The method of claim 14,
wherein the basic metadata comprising a CID of the target content, and
wherein the verifying the basic metadata comprises:
verifying the basic metadata based on whether the CID of the target content matches a CID of the target content registered in the IPFS.

19. The method of claim 14,
wherein the verifying the second ownership metadata comprises:
verifying the signature of the first user comprised in the second ownership metadata using second public key of the first user, wherein the second public key of the first user is restored based on the signature of the first user comprised in the second ownership metadata, and
wherein the verifying the first ownership metadata comprises:
verifying the signature of the first user comprised in the first ownership metadata using first public key of the first user, wherein the first public key of the first user is restored based on the signature of the first user comprised in the first ownership metadata.

20. The method of claim 19,
wherein the signatures of the first user comprised in the first ownership metadata and the second ownership metadata, is added through elliptic curve digital signature algorithm (ECDSA),
wherein the verifying the signature of the first user comprised in the second ownership metadata comprises:
restoring the second public key of the first user, only by using the signature of first user comprised in the second ownership itself, and wherein the verifying the signature of the first user comprised in the first ownership metadata comprises: restoring the first public key of the first user, only by using the signature of first user comprised in the first ownership itself.

\* \* \* \* \*